Nov. 23, 1937.　　　　　E. SPAHN　　　　　2,099,759
TIME MEASURING MECHANISM
Filed Oct. 24, 1935
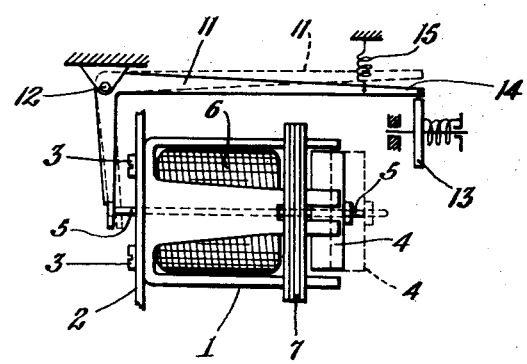
INVENTOR.
Emil Spahn
BY
Morgan, Finnegan & Durham
ATTORNEYS.

Patented Nov. 23, 1937

2,099,759

UNITED STATES PATENT OFFICE 2,099,759

TIME MEASURING MECHANISM

Emil Spahn, Zug, Switzerland, assignor to Landis & Gyr, A.-G., a corporation of Switzerland Application October 24, 1935, Serial No. 46,492
In Switzerland November 24, 1934

3 Claims. (Cl. 58—26)

The invention relates to new and useful improvements in time measuring mechanisms and more particularly to such improvements in synchronous motor controlled time measuring mechanisms, especially when employed in Bi-chronous systems.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Objects of the invention are to provide an exceedingly simple and reliable time measuring mechanism finding one of its chief fields of applicability and usefulness in driving and controlling a Bi-chronous time measuring system, that is, a system wherein the time measuring or indicating device, such as a clock, time-switch or the like, may be continually driven alternatively by a synchronous motor or by a spring-driven clock mechanism or other auxiliary driving means; the synchronous motor when energized driving the time measuring mechanism and winding the spring or other force for the auxiliary driving means, and automatically causing said auxiliary driving means to drive the time measuring or indicating mechanism upon failure or cutting off of the driving current of the motor. In accordance with the present invention, this control function of the synchronous motor over the auxiliary driving means is effected by utilizing the axially acting magnetic force to effect axial movement of the rotor of the motor. As preferably embodied, the rotor of the synchronous motor has axial movement in response to the axially acting magnetic force of the driving system, such movement through direct connections acting to arrest the auxiliary time measuring drive, and upon failure or cutting off of the current, axial movement of the rotor in the opposite direction releases said auxiliary time measuring drive so that the time measuring action is continuous, either through the driving of the synchronous motor or of the spring clock or other auxiliary mechanism. By my invention the use of relays or other electromagnetic or like auxiliary devices to control the operation of the auxiliary driving means for the clock, time-switch, and the like, is avoided, with resultant simplification of mechanism and economy of current.

In the embodiment of the invention illustrated by way of example in the accompanying drawing, a synchronous motor 1 is shown supported on a frame member 2 by suitable means such as screws 3. The rotor 4 of the motor is mounted on a shaft 5 which extends axially between the poles 7 and through the winding 6, and projects from the other end thereof. The rotor and its shaft are suitably journalled, and capable of longitudinal movement axially as shown in dotted and solid lines in the drawing. When the circuit is closed the action of the magnetic field moves the rotor and shaft to the full line position in the drawing, and suitable means are provided for moving them in the reverse direction to the dotted line position, when the circuit is discontinued.

In the present embodiment the rotor is shown mounted horizontally, and spring means are employed for effecting the reverse movement just described. In said embodied form, and in accordance with certain features of the invention, the movement of the rotor acts directly on the means for controlling the auxiliary time measuring mechanism, and as embodied, a right-angled detent lever 11 is pivotally mounted at 12, the end of one arm of the lever coacting with the end of the rotor shaft 5, and the other end 14 of the lever being engageable with and controlling an escapement-controlling balance wheel 13. A tension spring 15 acts upon the lever 11 to impel it to the dotted line position of the drawing. Means may be provided operated by said movement of the rotor for indicating circuit conditions, as for instance a device for indicating an open or closed circuit, and the member 14 may be regarded as representing such an indicating device, or it might be employed to hold and release the clock escapement and also to indicate whether the motor or the clock mechanism is doing the driving.

In the general type of Bi-chronous time measuring mechanism in which my invention finds one of its extensive and valuable applications, a gear train from the shaft 5 of the motor 1 drives the time measuring or indicating mechanism, such as a clock dial, time switch or the like, and a clock mechanism of any suitable construction, represented by the escapement balance wheel 13, such as a spring-driven mechanism, is also geared to drive the time indicating or measuring device. There are connections also from the motor shaft for driving the winding mechanism of the clock mechanism to keep it always wound, so that the clock mechanism would drive the time measuring mechanism for a long period after the current fails or is cut off. When the current is on, the motor is driven, and the rotor 4 and its shaft 5 are moved to the left to the full line position, the shaft engaging the lever 11 to rock it against the pull of the spring 15, and the detent 14 engages and holds the balance wheel 13 of the clock mechanism. When the current is cut off or fails, the spring 15 draws the lever 11 from the full line to the dotted line position, and the lever moves the rotor 4 and its shaft 5 from the full line to the dotted line position, and at the same time the detent 14 releases the balance wheel 13 and the clock mechanism begins to drive the time measuring or indicating device. According to certain features of the invention, the axial movement of the rotor, as described, may be employed for other purposes, as for instance, to operate a signal of any kind indicating circuit conditions, or to operate other devices dependent upon or indicating changes in circuit conditions.

The invention in its broader aspects is not limited to the specific mechanisms shown and described but departures may be made therefrom within the scope of the accompanying claims without departing from the principles of the invention and without sacrificing its chief advantages.

What I claim is:

1. A time measuring means for an electric circuit including in combination a balance wheel of a clock mechanism, a synchronous motor having a rotor axially movable under the influence of its magnetic driving flux, means normally holding the balance wheel against movement and means for releasing said holding means by axial shifting of the rotor when the flux is interrupted whereby interruption of the power supplied to the motor causes the balance wheel to be released.

2. A time measuring means for an electric circuit including in combination a balance wheel of a clock mechanism, a synchronous motor having a rotor axially movable under the influence of its magnetic driving flux, means for engaging the balance wheel and holding it against movement, a spring for releasing said engaging means, and means for moving the engaging means against said spring by the axial shifting of the rotor under the influence of its driving magnetic flux whereby the rotor and balance wheel are alternatively operable.

3. A time measuring means for an electric circuit including in combination a balance wheel of a clock mechanism, a synchronous motor having a rotor axially movable under the influence of its magnetic driving flux, a bell crank engaging the balance wheel and rotor for stopping the balance wheel by the rotor driving flux and a spring acting on said bell crank to release said balance wheel when the motor driving power is interrupted.

EMIL SPAHN.